No. 780,956. PATENTED JAN. 24, 1905.
F. C. PALMER.
WALL HOOK.
APPLICATION FILED JAN. 8, 1904.
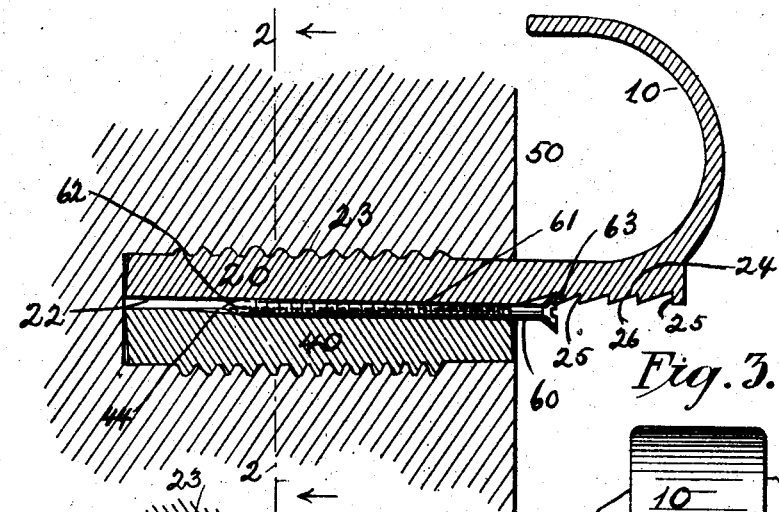
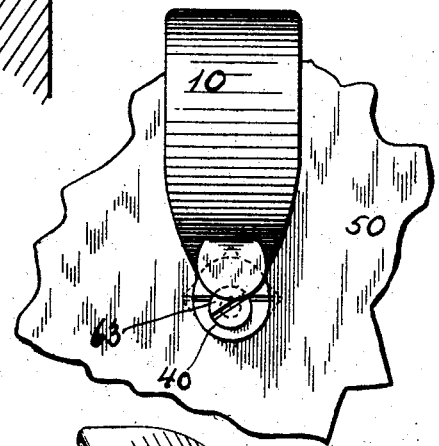
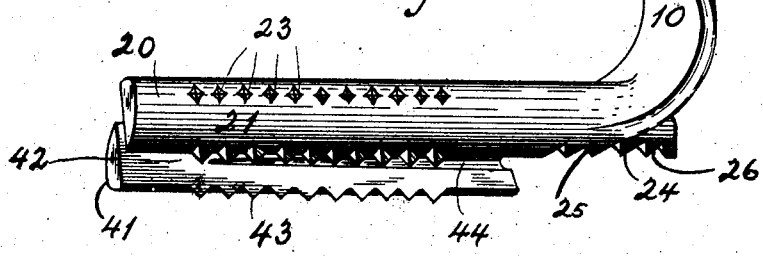
Witnesses
Frederick C. Palmer Inventor
By His Attorney William R. Baird No. 780,956.

Patented January 24, 1905.

UNITED STATES PATENT OFFICE.

FREDERICK C. PALMER, OF BROOKLYN, NEW YORK.

WALL-HOOK.

SPECIFICATION forming part of Letters Patent No. 780,956, dated January 24, 1905.

Application filed January 8, 1904. Serial No. 188,171.

*To all whom it may concern:*

Be it known that I, FREDERICK C. PALMER, a citizen of the United States, and a resident of Brooklyn, in the county of Kings and State of New York, have invented certain new and useful Improvements in Wall-Hooks, of which the following is a specification.

My invention relates to wall-hooks and similar articles and the method and means of securing the same in place.

By a "wall-hook" I mean an article comprising a hook portion designed to support another article engaged therein or upheld thereby and a suitable shank portion, means being provided to retain the same against the wall or similar surface to which it is secured.

So far as my knowledge of the art extends the means usually employed for securing wall-hooks to walls at present comprise a wooden plug driven into an aperture in the wall and into which in turn the shank of the wall-hook is driven. A plug of this character if wet rots and if dry shrinks, and thus rapidly deteriorates with age, and even when some other material is employed to fill the hole these hooks frequently work loose and drop their load.

The purpose of my invention is to overcome these disadvantages, and I believe that I have largely done so in the device herein described and illustrated.

In the drawings, Figure 1 is a vertical section of my improved wall-hook and the accompanying retaining devices and a portion of a wall in which they have been inserted. Fig. 2 is a section on the plane of the line 2 2 in Fig. 1. Fig. 3 is an end elevation looking toward the left; and Fig. 4 is a perspective view of the wall-hook and accompanying plug, the roughening projections being slightly modified in form.

In the drawings, 10 is the hook portion of a wall-hook adapted to secure and embrace a cable or a similar article placed between it and the wall 50, to which it is to be secured. This hook portion may be made of any shape in cross-section; but I prefer a somewhat rectangular form, which gives a rather broad supporting-surface with a minimum amount of material. It may be made of any material; but I prefer malleable iron on account of the readiness with which this material may be shaped.

The hook portion 10 is provided with a shank 20 of peculiar form, the latter being semicylindrical or semipolyhedral in cross-section, the rounded portion 21 being uppermost when secured in place and the flat portion 22 being lowermost and in a plane substantially coincident with the longitudinal horizontal diameter of the aperture in which the shank is placed. It is easiest to make holes cylindrical in cross-section, and for that reason I prefer to make the shank in this form, although it is obvious that variations may be made from this form without departing from the principle of the invention. The shank is also provided externally with a number of projections 23 of any desired form, which serve to roughen its exterior and enable it to take a firmer grip against the sides of the aperture. The lower side of the hook portion external to the wall is provided with a series of transverse flutings or indentations 24 24 for a purpose which will presently be described, and these flutings are preferably made with one vertical wall 25 and one wall 26, sloping downwardly and toward the inner end of the shank.

40 is a semicylindrical or semipolyhedral plug similar in size and general appearance to the shank 20. It is provided with a lower rounded surface 41 and an upper flat surface 42 and with external projections 43. It is also provided with a shallow groove 44, running from its front end toward the rear and gradually tapering inward until it finally disappears in the flat surface 42.

60 is a nail, screw, or similar article with a long body 61, a tapering point 62, and a conical or laterally-projecting head 63. This is of usual form and needs no particular description.

The method of using this device is as follows: The plug 40 is first inserted in the aperture drilled in the wall to receive it, and then over it is placed the shank 20. For convenience in making this insertion and securing the registration of the parts the shank 20 and the plug 40 may be first secured together by a cord or piece of wire; but its use is not essential. When the shank and plug have been inserted into the aperture as far as desired, the nail or screw 60 is placed at the outer end of the groove 44 and driven in the groove by blows from a hammer or similar instrument, and as it penetrates in the path of the groove it gradually presses against the lower surface 22 of the shank 20 and the upper surface of the plug 40 and tends to expand or press these two pieces apart, the external surfaces of the shank and plug being thus made to grip the walls of the aperture and tightly hold the shank and hook portion in place. In the drawing Fig. 1 the extent to which the projections 23 and 43 will penetrate into the wall 50 is much exaggerated; but this has been done for the purpose of specifically calling attention to the result of the divergence of the shank and plug due to the pressure of the nail. The head 63 of the nail 60 as it is driven inwardly comes into contact with the lower surface of the shank 20 and with the indentations 24, formed thereon. It readily passes over the inclined surfaces 26 as a pawl passes over a ratchet; but when it is once in place it rests against one of the vertical walls 25, and its accidental withdrawal is quite effectually prevented. Forcing apart the shank and the plug at the inner end of the aperture in which they are placed forces their outer ends toward each other, and this increases the grip of both upon the nail and likewise serves to lock the head of the nail against the indentations on the lower side of the shank. The weight of the body resting upon the hook portion between it and the wall serves to increase the contact-pressure between the parts also and to make them more efficient to perform the function for which they are adapted.

What I claim as new is—

1. The combination of a wall-hook comprising a hook portion and a shank adapted to be inserted in a hole in a wall, a plug adapted to be inserted into the hole with the shank, and means, comprising a nail or similar device to be driven between the shank and plug, for pressing apart said shank and plug after insertion.

2. The combination of a wall-hook comprising a hook portion and a shank adapted to be inserted in a hole in a wall, a plug adapted to be inserted in the hole with the shank, and having a groove in its face next to the shank, and means, comprising a nail or similar device adapted to be driven into said groove, for pressing apart the shank and plug after insertion.

3. The combination of a wall-hook comprising a hook portion and a shank adapted to be inserted in a hole in a wall, a plug adapted to be inserted in the hole with the shank, a nail adapted to be driven in between the shank and plug, and means for locking the nail in position after driving.

4. The combination of a wall-hook comprising a hook portion and a shank having indentations and adapted to be inserted in a hole in a wall, a plug adapted to be inserted in the hole with the shank, and means comprising a nail or similar device having an expanded head adapted to engage in said indentations, for pressing the shank and plug apart.

5. The combination of a wall-hook comprising a hook portion and a shank having indentations and adapted to be inserted in a hole in the wall, a grooved plug adapted to be inserted in the hole with the shank, and means, comprising a nail or similar device adapted to fit in the groove of the plug and having an expanded head adapted to engage in said indentations, for pressing the shank and plug apart.

Witness my hand, this 6th day of January, 1904, at the city of New York, in the county and State of New York.

FREDERICK C. PALMER.

Witnesses:
S. J. Cox,
BARTLETT J. SMITH.